United States Patent
Takeshima et al.

(10) Patent No.: US 6,907,612 B2
(45) Date of Patent: Jun. 14, 2005

(54) DISC DEVICE

(75) Inventors: Masaaki Takeshima, Tokyo (JP); Eiji Niikura, Tokyo (JP); Takeshi Inatani, Tokyo (JP); Kei Shirahata, Tokyo (JP); Kazutoshi Taniguchi, Tokyo (JP); Takashi Kuzuu, Tokyo (JP); Shoji Tatehata, Tokyo (JP); Eiji Sasaki, Tokyo (JP); Tetsurou Nagami, Tokyo (JP); Kiichiro Murotani, Tokyo (JP); Hisashi Morita, Tokyo (JP); Nao Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 42 days.

(21) Appl. No.: 10/432,244
(22) PCT Filed: Oct. 24, 2001
(86) PCT No.: PCT/JP01/09349
§ 371 (c)(1),
(2), (4) Date: May 22, 2003
(87) PCT Pub. No.: WO03/036636
PCT Pub. Date: May 1, 2003

(65) Prior Publication Data
US 2004/0017756 A1 Jan. 29, 2004

(51) Int. Cl.$^7$ .......................... G11B 17/03; G11B 23/00
(52) U.S. Cl. ..................................... 720/605; 369/270.1
(58) Field of Search ................................ 720/605, 604; 360/270.1, 30.81, 184, 30.89

(56) References Cited

U.S. PATENT DOCUMENTS

| 6,493,294 B1 | * | 12/2002 | Yoshida et al. | ........... 369/30.81 |
| 6,567,369 B2 | * | 5/2003 | Yoshida et al. | ............. 369/184 |
| 6,580,668 B2 | * | 6/2003 | Nagasaka et al. | ........ 369/30.85 |

FOREIGN PATENT DOCUMENTS

| EP | 0 962 925 A2 | 12/1999 |
| JP | 11-353769 A | 12/1999 |

* cited by examiner

Primary Examiner—Allen Cao
(74) Attorney, Agent, or Firm—Birch, Stewart, Kolasch & Birch, LLP

(57) ABSTRACT

By a disk device including: a reproducing base which is supported pivotally and enably to swing on a base, and on which a turntable is set; a supporting member which is supported pivotally and enably to swing on the base and which supports the reproducing base in a predetermined position; a clamper which is supported pivotally and enably to swing on the base and which opposes to the turntable to pinch and hold a disk; and a movement regulating member which regulates swing movements of the supporting member and the clamper, supporting by the supporting member in relation to the reproducing base is made sure to prevent deformation of the reproducing base by a clamping force of the clamper.

4 Claims, 14 Drawing Sheets (a)

DISC DEVICE

This application is the national phase under 35 U.S.C. § 371 of PCT International Application No. PCT/JP01/09349 which has an International filing date of Oct. 24, 2001, which designated the United States of America.

TECHNICAL FIELD

The present invention relates to a disk device in which a reproducing base can be positioned in a predetermined position.

BACKGROUND ART

A disk device in the prior art, for example, disclosed in Japanese Laid Open Patent Hei 11-353769, regulates its operation only by movable pin and circular arch groove (no description is found out about an urging by spring and the like which has a limiting function) when a drawing type reproducing base is swung to be positioned. By this reason there is a possibility that a swing position of the reproducing base cannot accurately be decided even when a locking member is prepared which engages with a swinging end portion of the reproducing base.

And when the reproducing base is held by a swingable locking arm, because the locking arm is driven by different driving source from a driving means for swinging operation of the reproducing base, thereby synchronization between the locking arm and a clamper is hardly attained, there is a fear that the locking arm cannot surely engage with the reproducing base before a clamping operation begins, and mechanism becomes complicated.

Because the disk device in the prior art is composed as described above, it causes a problem that a drawing type reproducing base cannot accurately be positioned even when the drawing type reproducing base is swung to a predetermined position.

Further because the locking arm cannot surely engage with the reproducing base before the clamping operation, it causes a problem that there is a possibility of deformation of the reproducing base by a clamping force of the clamper.

The present invention has been made to solve the above described problems and it is an object of the invention to provide a disk device in which the reproducing base is surely supported and the deformation of reproducing base can be prevented.

And it is another object of the invention to provide a disk device in which the reproducing base can be accurately positioned in a predetermined position.

DISCLOSURE OF THE INVENTION

The disk device in accordance with the present invention includes a movement regulating member to regulate swing movements of a supporting member and a clamper.

By this arrangement an effect can be produced that supporting by the supporting member in relation to the reproducing base is made sure to prevent deformation of the reproducing base by a clamping force of the clamper.

In the disk device in accordance with the present invention an engaging and abutting portion between the supporting member and the reproducing base is constituted such that an engaging and abutting surface between the supported member and the reproducing base matches substantially with a tangential direction of swing locus of the supporting member.

By this arrangement an effect can be produced that the reproducing base is accurately positioned in a predetermined position.

In the disk device in accordance with the present invention the engaging and abutting portion between the supporting member and the reproducing base is made to be claw shapes which engage each other.

By this arrangement an effect can be produced that the supporting member and the reproducing base surely engage together without having a complicated constitution.

In the disk device in accordance with the present invention the movement regulating member is made for the clamper to begin clamping the disk after the supporting member and the reproducing base engage together.

By this arrangement an effect can be produced that it is prevented the clamper applies a clamping force before the supporting member holds the reproducing base.

BRIEF DESCRIPTION OF THE DRAWINGS

FIG. 6 are explanatory diagrams to show an operation in a fourth stage of the disk device.

BEST MODE FOR CARRYING OUT THE INVENTION

For explaining the present invention in more detail, best modes for carrying out the invention will be described hereinafter with reference to the accompanied drawings.
Embodiment 1

Figure 1:
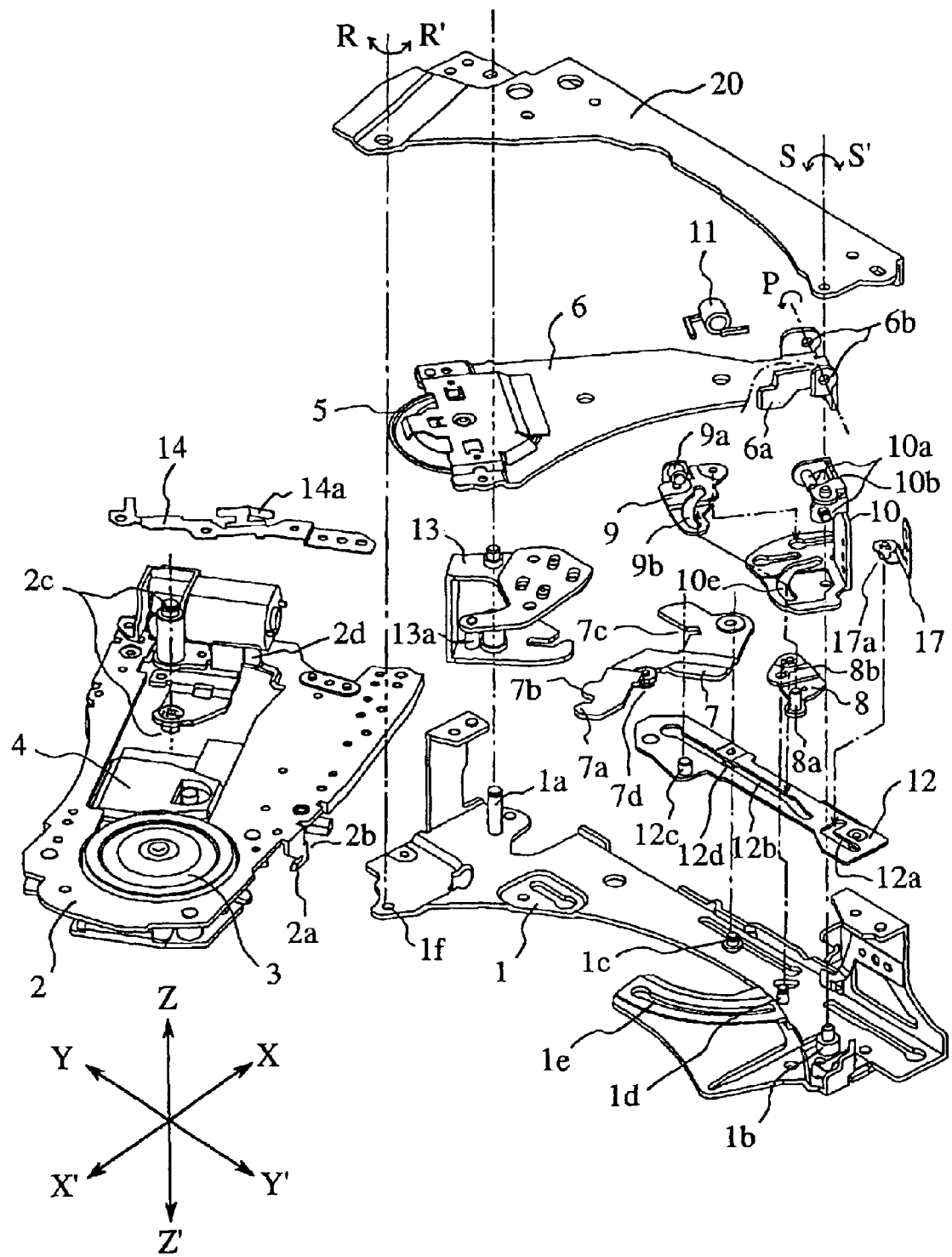
FIG. 1 is an exploded perspective view to show a disk device in accordance with Embodiment 1 of the present invention.

FIG. 1 is an exploded perspective view to show a disk device in accordance with Embodiment 1 of the present invention, in the drawing a reference numeral 1 designates a base on which supporting axes 1a, 1b, 1c, 1d are arranged to stand and guiding holes 1e, 1f are made, 2 designates a reproducing base which has a supporting axis 2c to penetrate the guiding hole 1f of base 1 and which is supported pivotally and enably to swing by the base 1, 3 designates a turn table which is arranged on the reproducing base 2 and on which a disk is loaded, 4 designates an optical pick up which is set on the reproducing base 2.

A reference numeral 5 designates a clamper which is opposed to the turn table 3 to pinch and hold a disk, 6 designates a clamper arm which is supported enably to swing by insertion of a hole 6b onto a supporting axis 10a of clamper base 10 to hold the clamper 5, and the clamper arm 6 has a cam shape 6a to regulate an attitude of the clamper arm 6 in Z direction with abutment onto a roller 9a of clamper plate 9.

A reference numeral 7 designates a supporting member which has a claw shape 7a to engage with a claw shape 2a of the reproducing base 2 and at the same time has a cam shape 7b to engage with a wall shape 2b of the reproducing base 2, and the wall shape 2b is arranged to match with a tangential direction of swing locus of the supporting member. A pin 7d of the supporting member 7 regulates a looseness of the supporting member 7 along Z direction by means of engagement with the guiding hole 1e of base 1.

A reference numeral 8 designates a clamper driving member which has a pin 8a to be inserted into a cam hole 9b of the clamper plate 9, 9 designates the clamper plate which is slidably supported by the clamper base 10, 10 designates the clamper base on which a cam hole 10e to be inserted by the pin 8a of clamper driving member 8, 11 designates a clamper spring which is inserted in the supporting axis 10a of clamper base 10 to energize the clamper arm 6 in P direction by means that one end portion abuts with the clamper arm 6 and another end portion abuts with a cut portion 10b of the clamper base 10.

A reference numeral 12 designates a movement regulating member which is slidably supported along Y direction by the base 1 to regulate swing movements of the clamper base 10, the supporting member 7 and the clamper driving member 8, a cam hole 12a of the movement regulating member 12 engages with a pin 17a of sub base 17 which is fixed by the clamper base 10 and a cam hole 12b is inserted into by the supporting axis 1c of base 1 to engage with a pin 8b on the clamper driving member 8. At this point a pin 12c on the movement regulating member 12 engages with a cam shape 7c which is made on the supporting member 7.

A reference numeral 13 designates a swing regulating member to regulate a swing movement of the reproducing base 2, a pin 13a on the swing regulating member 13 engages with a space formed between a cam wall 2d which is set on the reproducing base 2 and a wall portion 14a which is set on a leaf spring 14 to define a position of the swing movement thereby to regulate swing movement of the reproducing base 2. A reference numeral 14 designates the leaf spring to absorb a looseness between the pin 13a and the cam wall 2d by means that the pin 13a is pressed onto the cam wall 2d, 17 designates a sub base, and 20 designates a base top.

Figure 8:
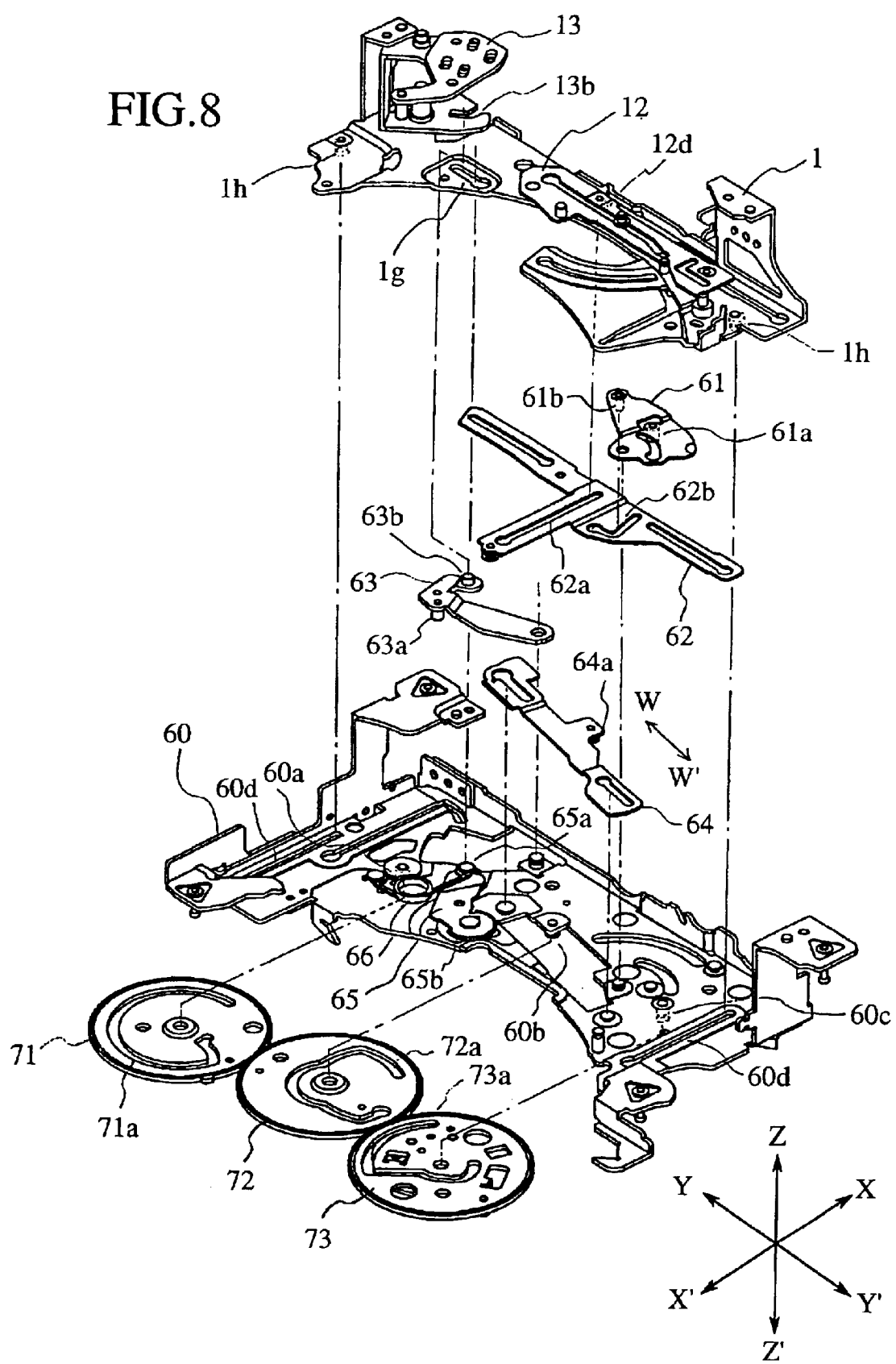
FIG. 8 is an exploded perspective view to show parts arranged at lower part of the base.

FIG. 8 is an exploded perspective view to show parts arranged at lower part of the base 1, and in the drawing a reference numeral 60 designates a deck base onto that supporting axes 60a, 60b, 60c are planted to stand which support enably to swing cam gear 71, cam gear 72, cam gear 73. At the same time the deck base 60 has a guiding hole 60d to engage with a pin 1h which is planted to stand on the base 1.

A sliding movement of the movement regulating member 12 is achieved by a straight moving plate 62, which is supported slidably along Y–Y' direction by the deck base 60 thereby for a cam hole 62a to engage with a pin 12d on the movement regulating member 12.

A lever 61 is supported pivotally and enably to swing by the deck base 60 to regulate a movement of the straight moving plate 62 by means that a pin 61b engages with a cam hole 62b on the straight moving plate 62. And by means that a pin 61a on the lever 61 engages with a cam hole 73a on the cam gear 73, a movement of the lever 61 is regulated by the cam gear 73.

A swing movement of the swing regulating member 13 is achieved by a lever 63, which is supported pivotally and enably to swing by the deck base 60 thereby for a pin 63a to engage with a cam hole 13b on the swing regulating member 13. And by means that a pin 63a on the lever 63 engages with a cam hole 71a on the cam gear 71, a movement of the lever 63 is regulated by the cam gear 71.

A sliding movement of the base 1 along X–X' direction is achieved by a lever 65, which is supported pivotally and enably to swing by the deck base 60 thereby for a pin 65a to engage with a cam hole 1g on the base 1. And an inverting spring 66 is hung between the deck base 60 and the lever 65 to surely position the base 1 at its start point and end point by giving a proper urging force to base 1 at a start point and an end point of the lever 65.

A rack plate 64 is supported slidably along W–W' direction by the deck base 60 to regulate an operation of the lever 65 by means of chacking with a pinion gear 65b on the lever 65. At the same time by means that a pin 64a on the rack plate 64 engages with a cam hole 72a on the cam gear 72, an operation of rack plate 64 is regulated by the cam gear 72. Hereinafter an operation of the disk device will be explained.

Figure 2:
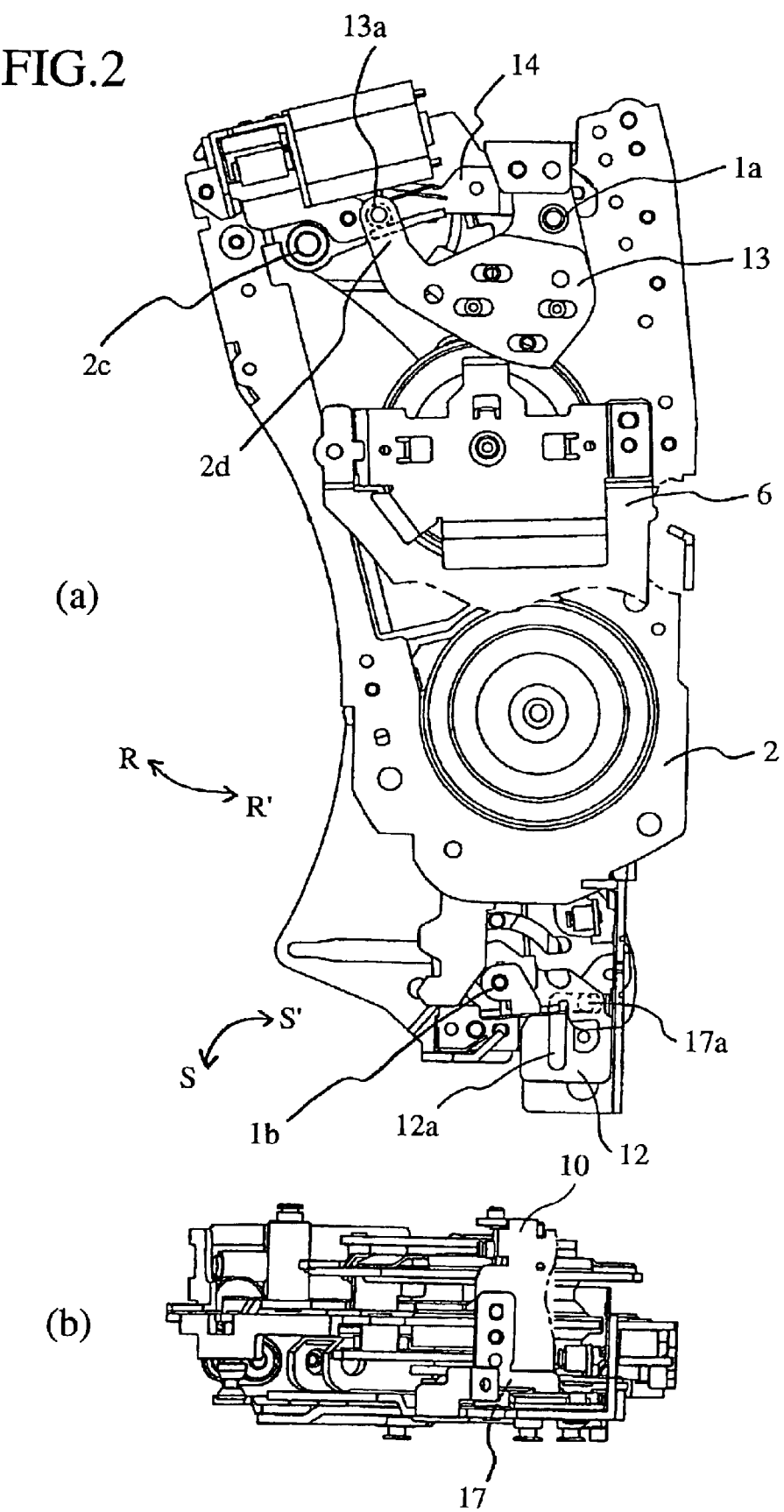
FIG. 2 are explanatory diagrams to show a disk device when it is in a stand-by state.
Figure 9:
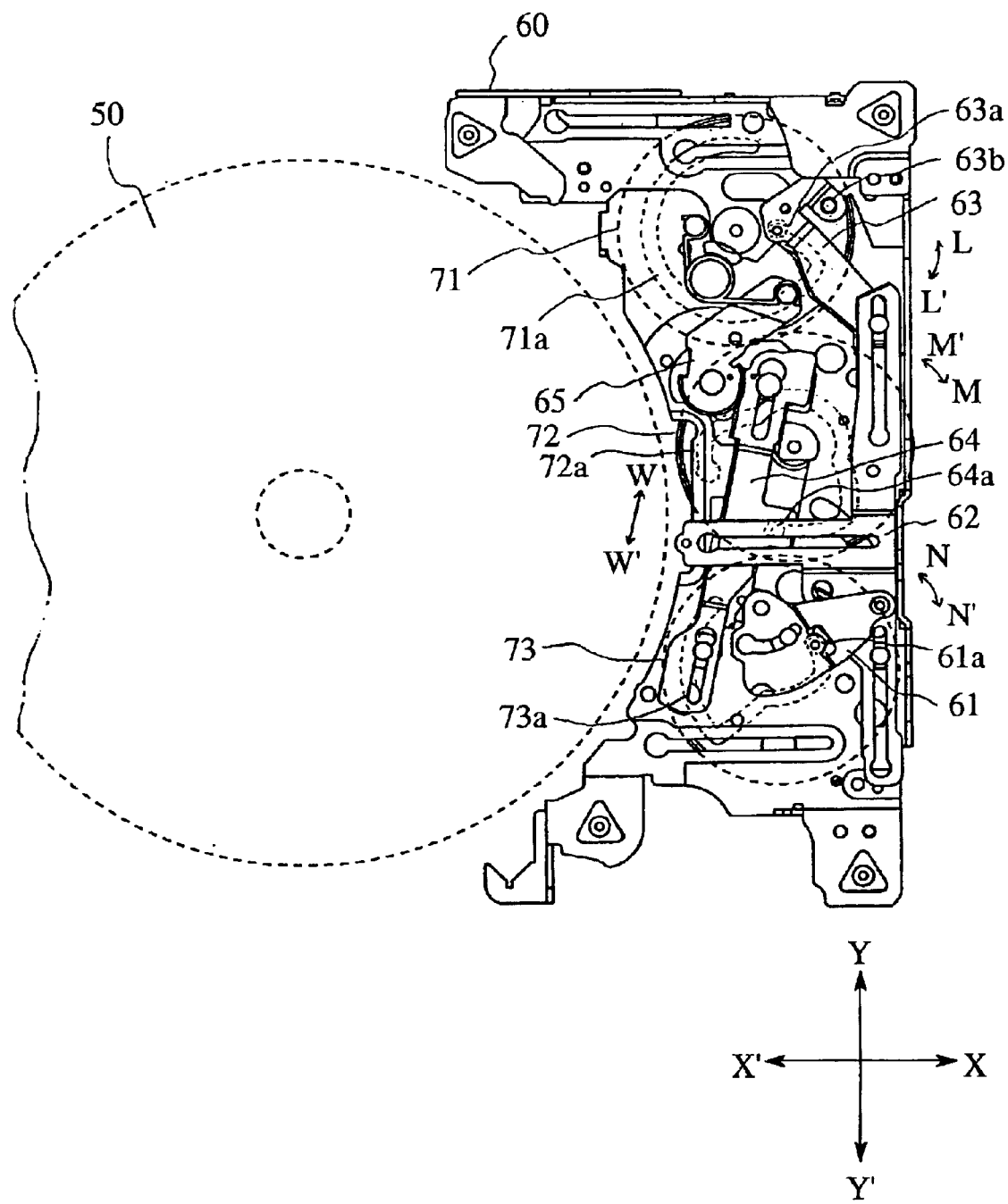
FIG. 9 is an explanatory diagram to show a disk device when it is in a stand-by state.

FIG. 2 and FIG. 9 are explanatory diagrams to show a disk device when it is in a stand-by state.

<Operation in First Stage>

Figure 3:
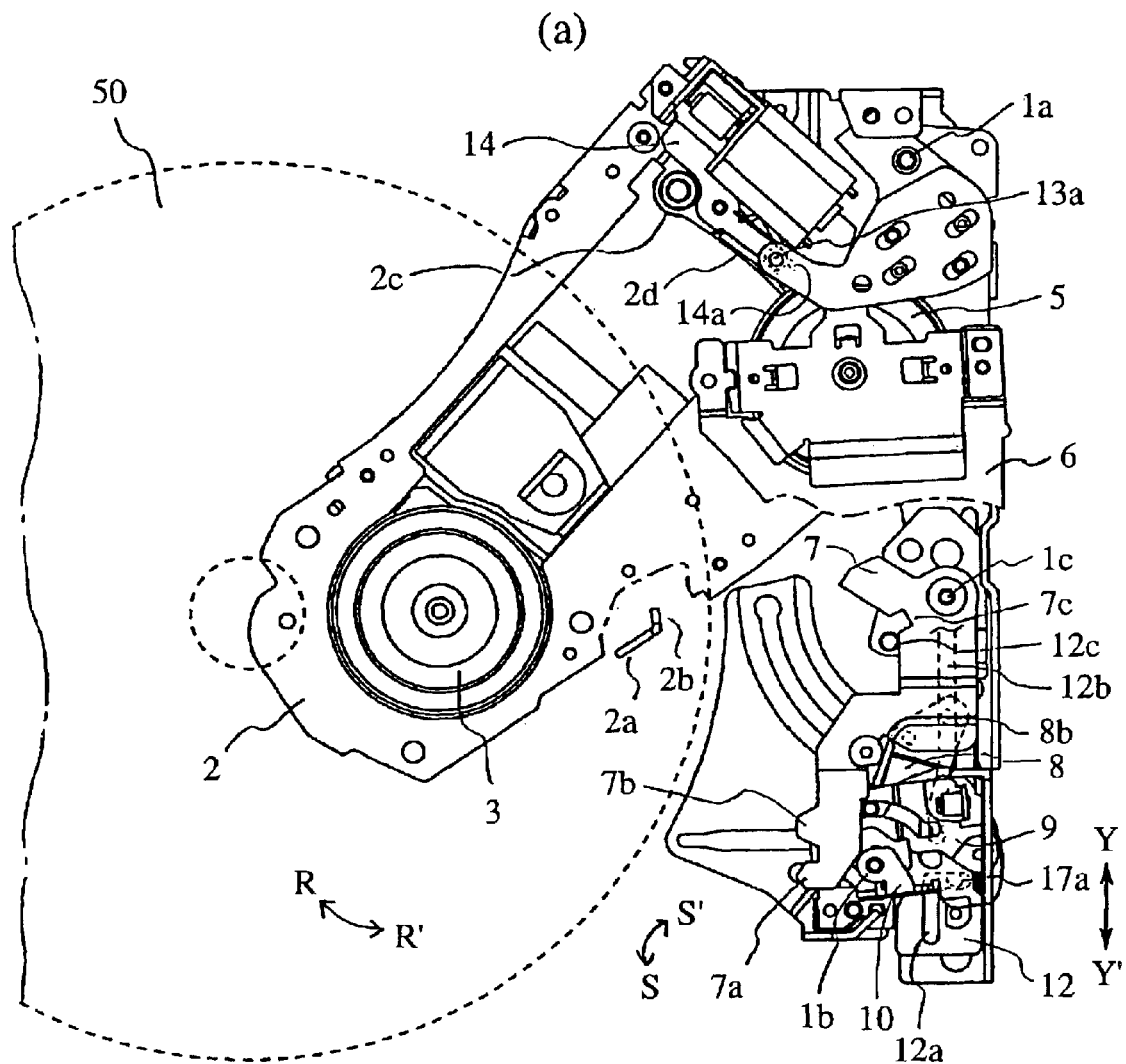
FIG. 3 are explanatory diagrams to show an operation in a first stage of the disk device.
Figure 3:
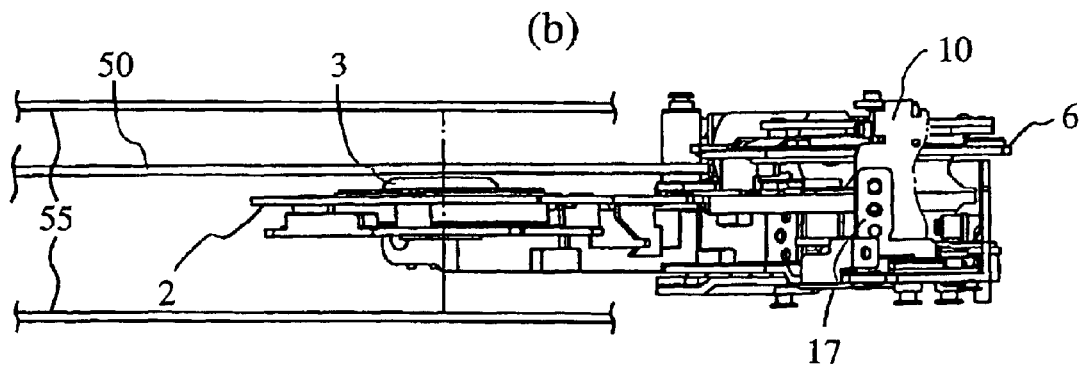
Figure 10:
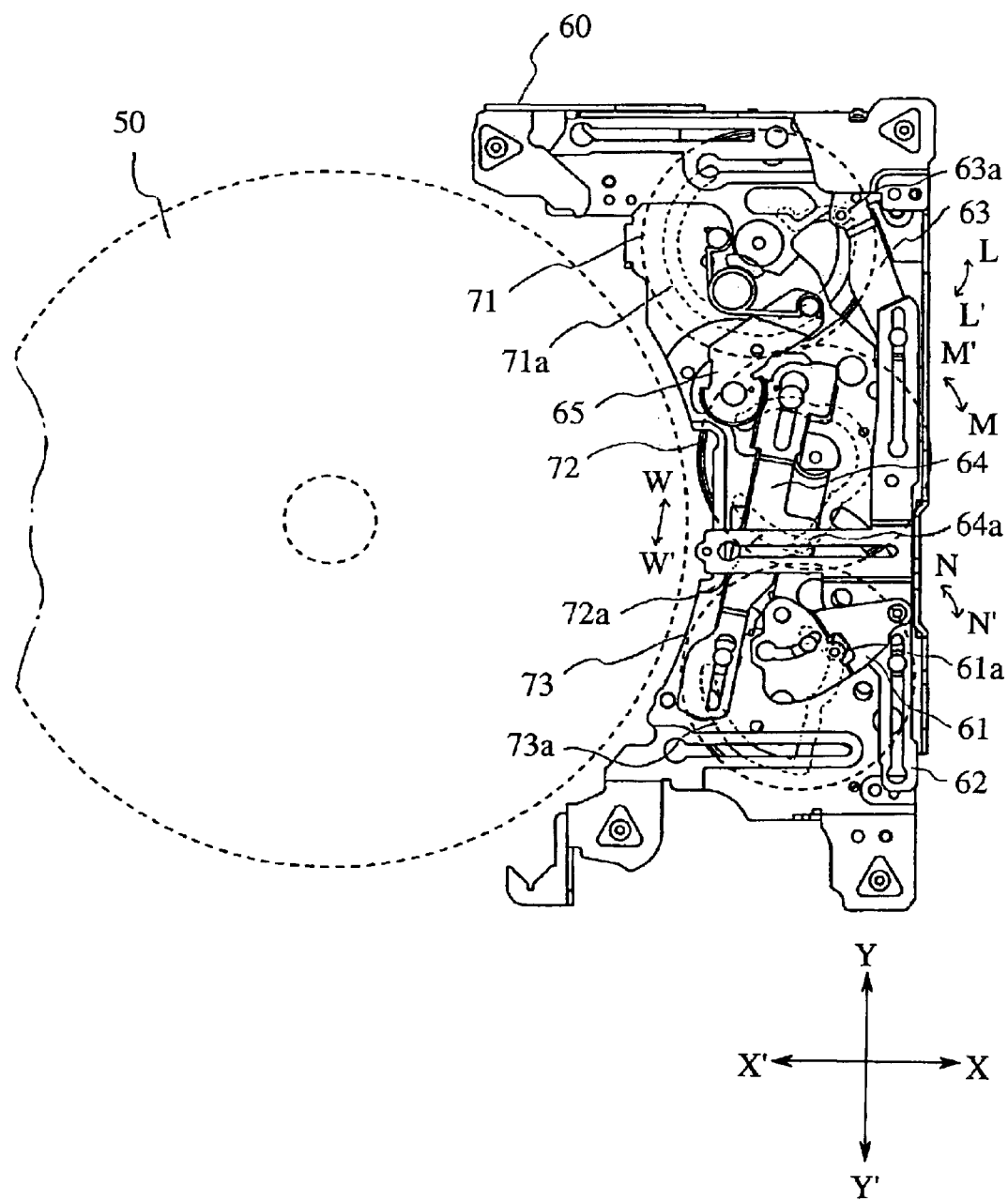
FIG. 10 is an explanatory diagram to show an operation in a first stage of the disk device.

After an arbitrary disk 50 is selected by a disk pinching and holding mechanism which is not show in the drawing, the cam gear 71 is made to swing in L direction of the drawing by a driving source and a clutch mechanism which are not shown in the drawing to swing the lever 63, and by means that the lever 63 is made to swing, thereby the swing regulating member 13 is made to swing around the supporting axis 1a as a center in R' direction of the drawing, the cam wall 2d on the reproducing base 2 is pushed by the pin 13a, and the reproducing base 2 is made to swing around the supporting axis 2c as a center in R direction of the drawing to a predetermined position, then a state shown in FIG. 3 and FIG. 10 is realized.

At this point a center position of the reproducing base 2 and the selected disk 50 in Y–Y' direction is positioned at a place where the reproducing base 2 is slightly shifted in R' direction. By the leaf spring 14, the pin 13a of swing regulating member 13 is made to abut onto the cam wall 2d and the reproducing base 2 is energized.

Here though the cam gear 72 swings in M direction of the drawing and the cam gear 73 swings in N direction of the drawing, the rack plate 64 and the lever 61 are not moved because the cam holes 72a, 73a have shapes of concentric circles, as a result of this base 1 and clamper base 10 are also not moved.

<Operation in Second Stage>

Figure 4:
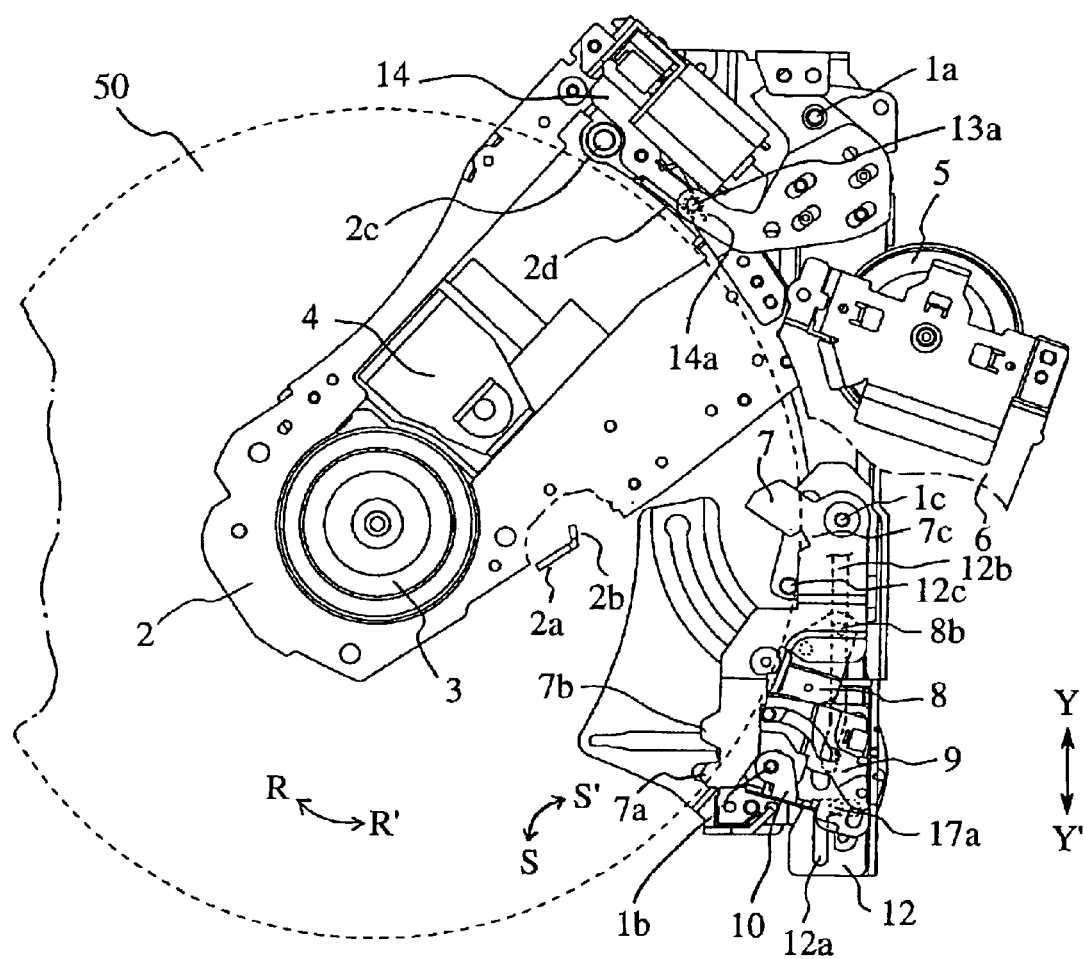
FIG. 4 are explanatory diagrams to show an operation in a second stage of the disk device.
Figure 4:
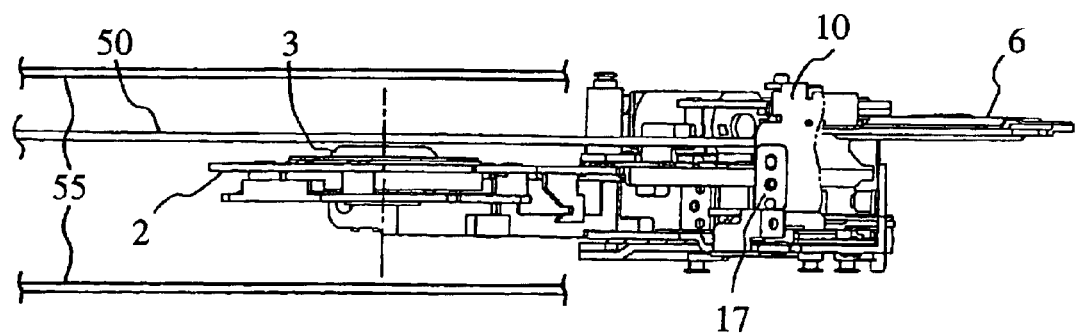
Figure 11:
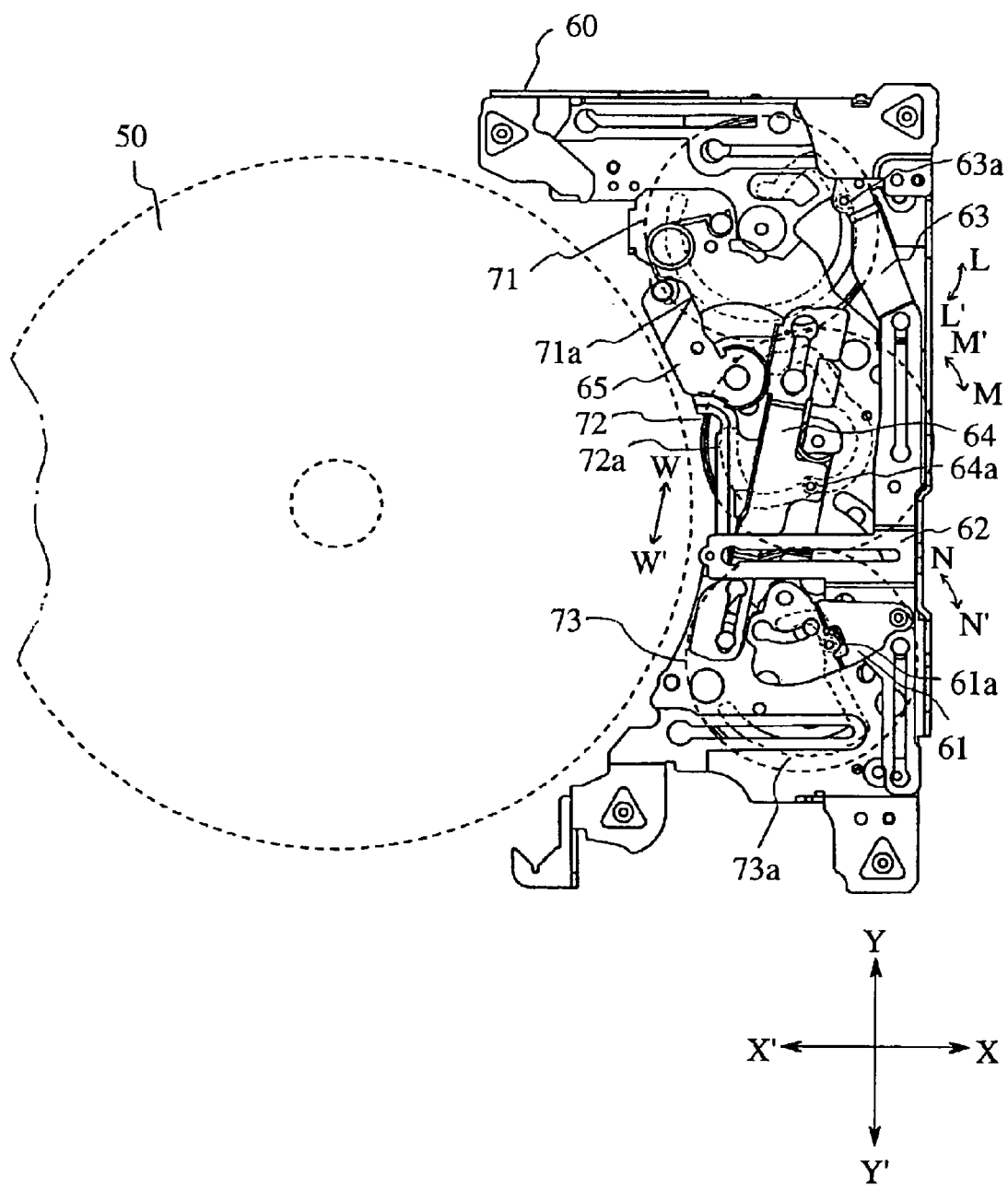
FIG. 11 is an explanatory diagram to show an operation in a second stage of the disk device.

Further the cam gear 72 swings more and the rack plate 64 is made to move in W direction of the drawing, thereby the lever 65 is made to swing and the base 1 moves in X' direction of the drawing to a predetermined central position of the waiting disk 55, then a state shown in FIG. 4 and FIG. 11 is realized.

At this point the lever 61 is made to swing by the cam gear 73, and the straight moving plate 62 moves in Y' direction of the drawing. In connection with this operation, the movement regulating member 12 also moves in Y' direction, and a horizontal portion of the cam hole 12a moves, thereby pin 17a of the sub base 17 is driven and the clamper base 10 swings around the supporting axis 1b as a center in S' direction of the drawing to a predetermined position. By this operation it is prevented that the selected disk 50 and the clamper arm 6 are superposed together.

Herein because the pin 8b on clamper driving member 8 exists on a straight portion of the cam hole 12b on the movement regulating member 12 and it is not effected by the above operation, the clamper plate 9 is not moved, and as a result the clamper arm 6 moves to a predetermined position in a state that an attitude of the clamper arm 6 in Z direction is kept in stable.

And the cam gear 71 swings in L direction of the drawing, however, the lever 63 is not moved because the cam hole 71a has a concentric shape, as a result of this the reproducing base 2 also is not moves and stayed at a predetermined swung position to move to a predetermined center position of the waiting disk 55 with the base 1.

<Operation in Third Stage>

Figure 5:
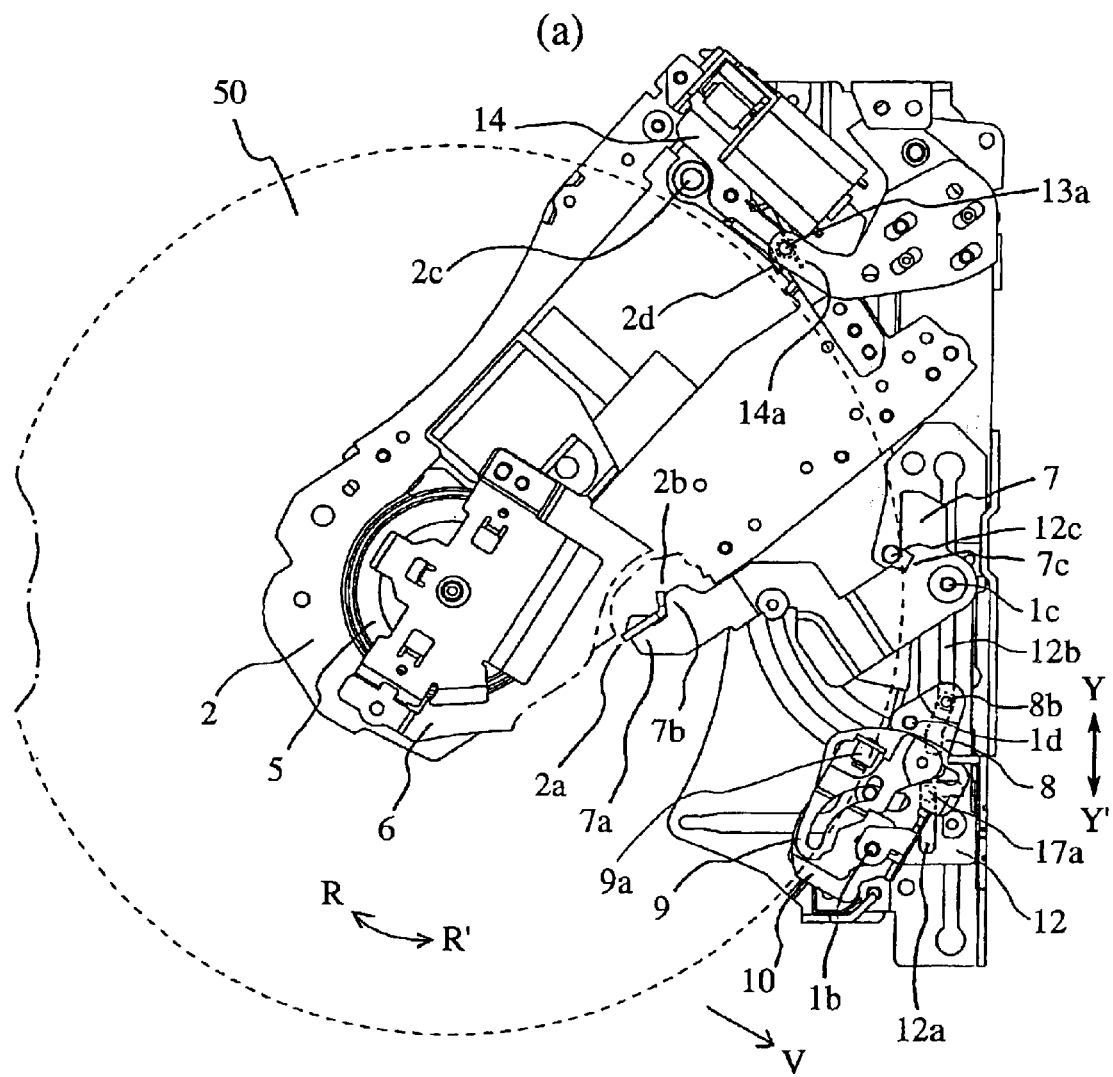
FIG. 5 are explanatory diagrams to show an operation in a third stage of the disk device.
Figure 5:
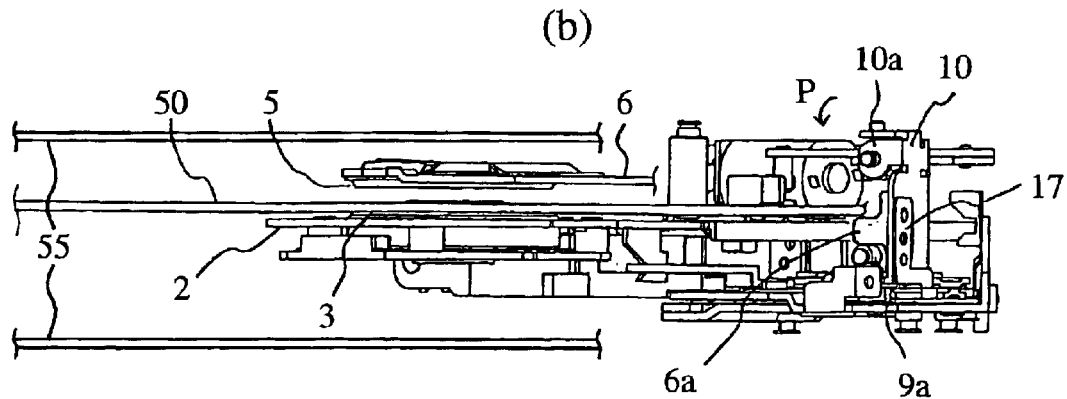
Figure 12:
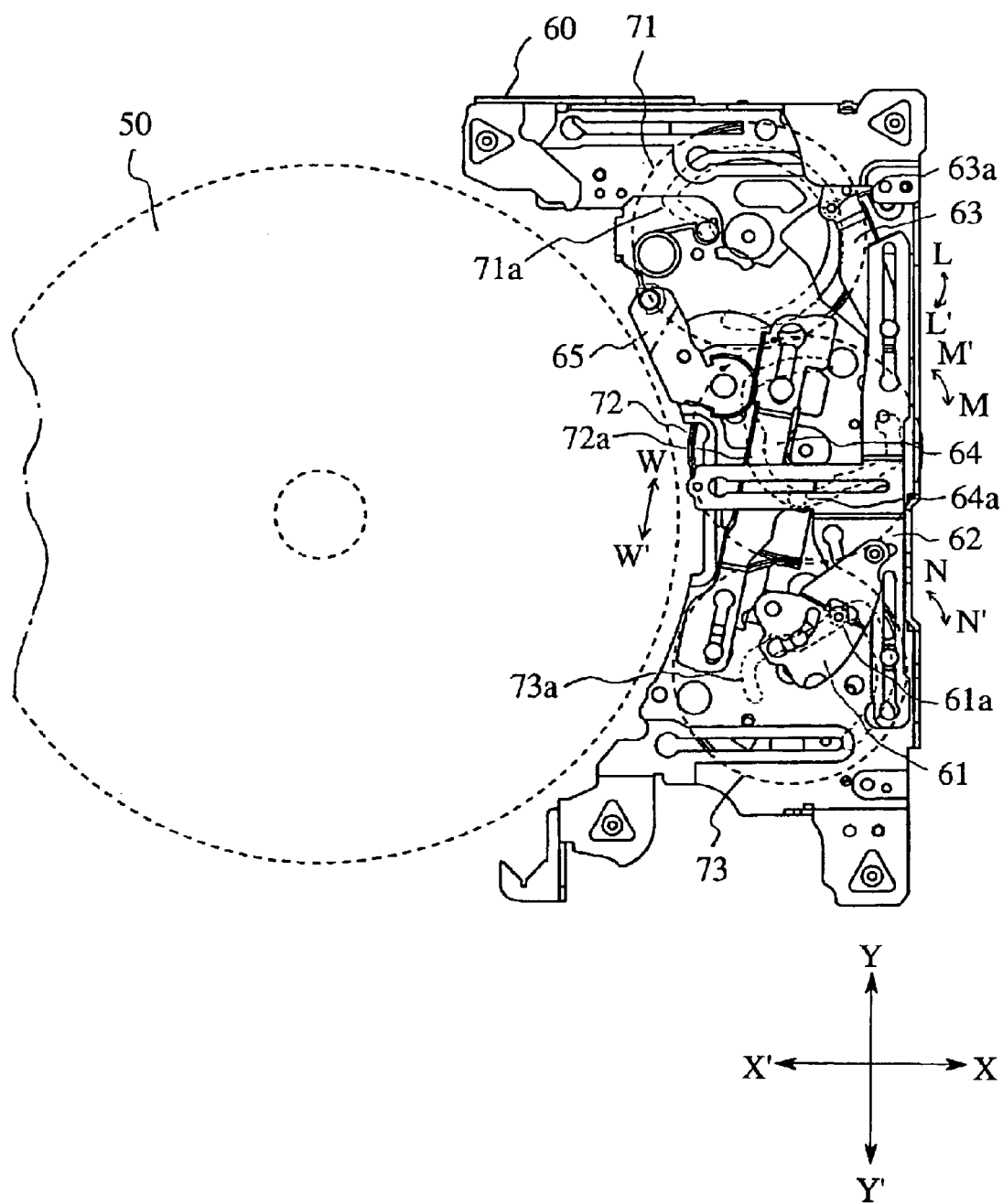
FIG. 12 is an explanatory diagram to show an operation in a third stage of the disk device.

After the selected disk 50 is put on the turn table 3 by the disk pinching and holding mechanism which is not shown in the drawing, then the lever 61 is made to swing more by the cam gear 73, thereby the straight moving plate 62 moves in Y direction of the drawing. In connection with this operation the movement regulating member 12 is also moved in Y direction of the drawing, by means that the horizontal portion of cam hole 12a moves, the pin 17a on sub base 17 is driven and the clamper base 10 swings to a predetermined position around the supporting axis 1b as a center in S direction of the drawing, then a state shown in FIG. 5 and FIG. 12 is realized.

At this point the pin 12c on the movement regulating member 12 abuts onto the cam shape 7c, the supporting member 7 swings in R direction of the drawing around the supporting axis 1c as a center, and the claw shape 7a and the claw shape 2a of reproducing base 2 are engaged together, thereby a positioning of the reproducing base 2 in Z direction is surely performed. At the same time by means that the cam shape 7b abuts onto the wall shape 2b of reproducing base 2, the reproducing base 2 is made to swing slightly in R direction of the drawing around the supporting axis 2c as a center, thereby centers of the turn table 3 and the selected disk 50 are accurately aligned. In connection with this operation the pin 13a of swing regulating member 13 is slightly removed from the cam wall 2d to flex the leaf spring 14, thereby the reproducing base 2 is energized in R' direction of the drawing by the leaf spring 14 and the supporting member 7.

By this operation a position of reproducing base 2 after swinging is surely defined by the supporting member 7. At the same time because the wall shape 2b is made such that it becomes a tangential direction of swing locus of the supporting member 7, it is not so influenced by a looseness caused by driving of the supporting member 7, the swinging position of the reproducing base 2 can be accurately decided.

Also swinging operations of the clamper base 10 and the supporting member 7 are regulated only by the movement regulating member 12, a discrepancy of driving timing for both of them can be cleared, thereby the supporting member 7 can be surely engaged with the reproducing base 2 before the clamping operation by means that the supporting member 7 is made to swing in the same timing of swinging of the clamper base 10.

At this moment because the pin 8b of clamper driving member 8 exists on a straight portion of the cam hole 12b on the movement regulating member 12 and it is not effected by the above operation, the clamper plate 9 is not moved, and as a result the clamper arm 6 moves to a predetermined position in a state that an attitude on the clamper arm 6 in Z direction is kept in stable.

Herein the cam gear 71 swings in L direction of the drawing and the cam gear 72 swings in M direction of the drawing, however, the lever 63 and the rack plate 64 are not moved because the cam hole 71a and 72a have concentric shapes, as a result of these the reproducing base 2 and the base 1 are also not moved and stayed at the predetermined center position of waiting disk 55.

<Operation in Fourth Stage>

Further the lever 61 is made to swing more by the cam gear 73, and the straight moving plate 62 is moved in Y direction of the drawing. In connection with this operation the movement regulating member 12 is also moved in Y direction of the drawing, the pin 8b of clamper driving member 8 is driven by a slope of the cam hole 12b, thereby the clamper driving member 8 is made to swing in R' direction around the supporting axis 1d as a center.

Figure 6:
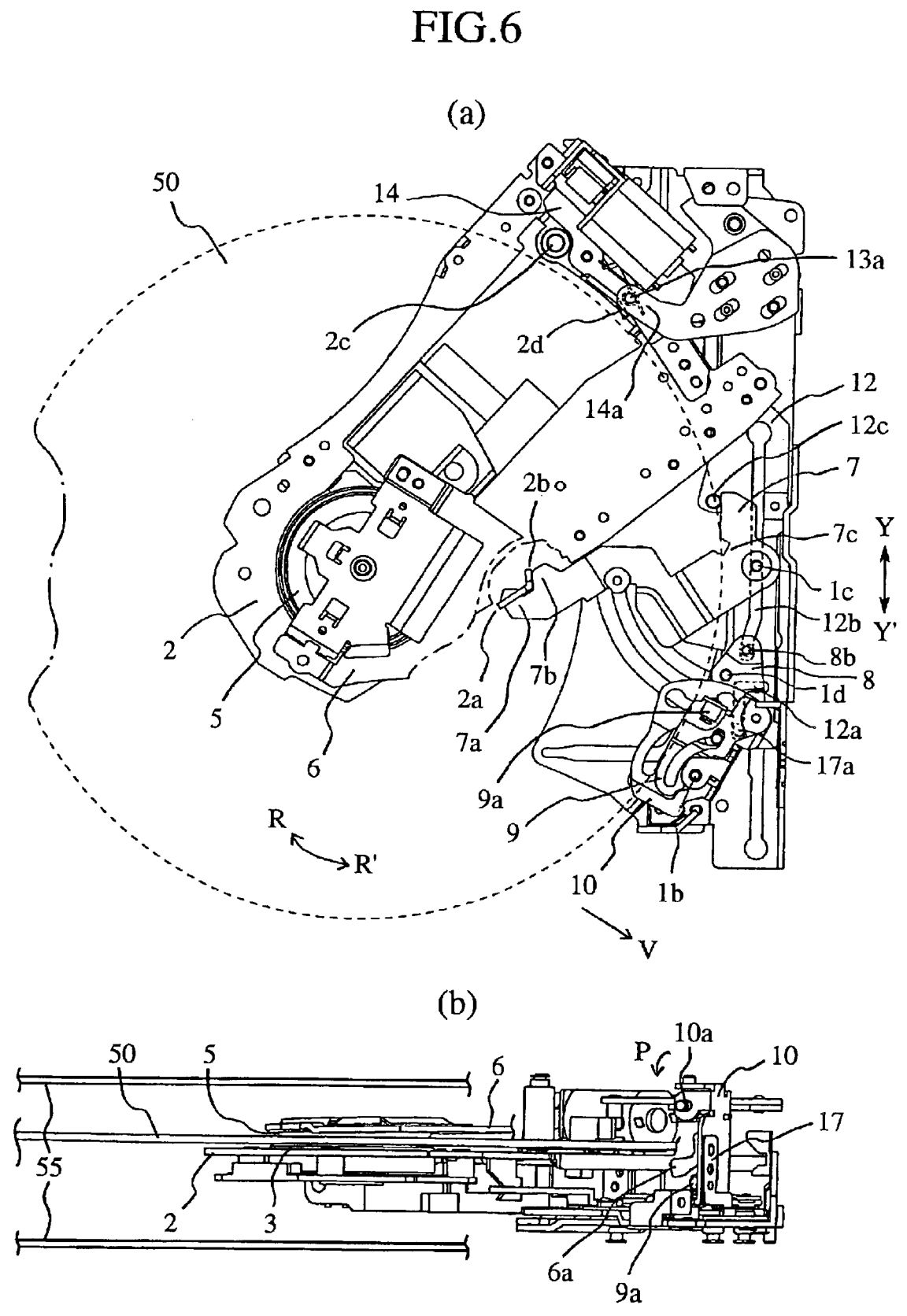
Figure 13:
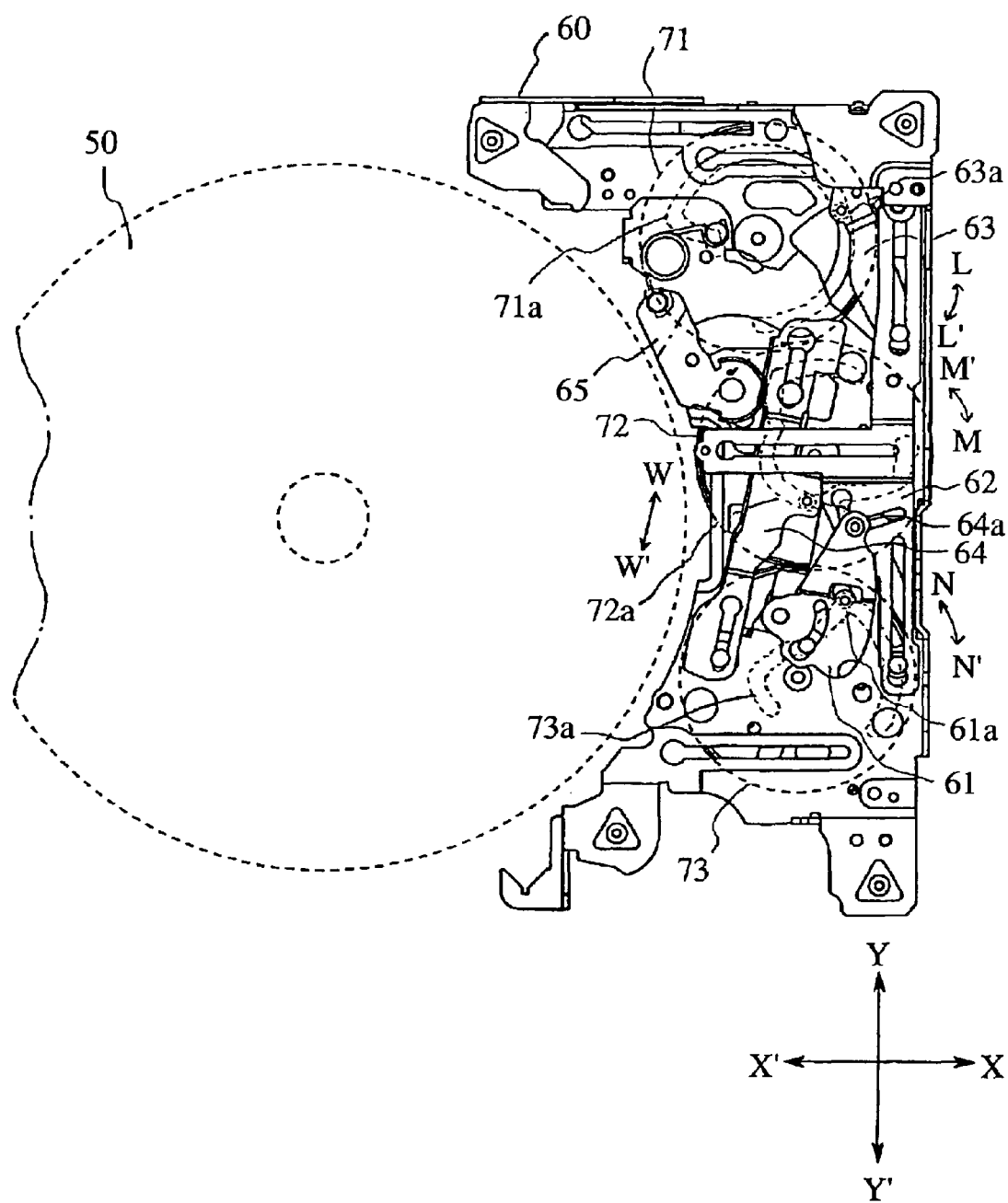
FIG. 13 is an explanatory diagram to show an operation in a fourth stage of the disk device.

In connection with this operation the clamper plate 9 is made to slide in V direction of the drawing on the clamper base 10, and the roller 9a is made to remove from the cam shape 6a of clamper arm 6, thereby the clamper arm 6 is made to fluctuate in P direction of the drawing around the supporting axis 10a of clamper base 10 as a center, thereby the clamper 5 presses and holds the selected disk 50 onto the turn table 3, then a state shown in FIG. 6 and FIG. 13 is realized.

At this point a position of the clamper base 10 is not changed and it is stable because the pin 17a of sub base 17 exists on the straight portion of cam hole 12a when movement regulating member 12 moves in Y direction of the drawing.

Also because the pin 12c of movement regulating member 12 moves in a straight portion of the cam shape 7c on the supporting member 7, a position of the supporting member 7 is not changed and it is stable.

Herein the cam gear 71 swings in L direction of the drawing and the cam gear 72 swings in M direction of the drawing, however, the lever 63 and the rack plate 64 are not moved because the cam hole 71a and 72a have concentric shapes, as a result of these the reproducing base 2 and the base 1 are also not moved and stayed at the predetermined center position of waiting disk 55.

<Operation in Fifth Stage>

Figure 7:
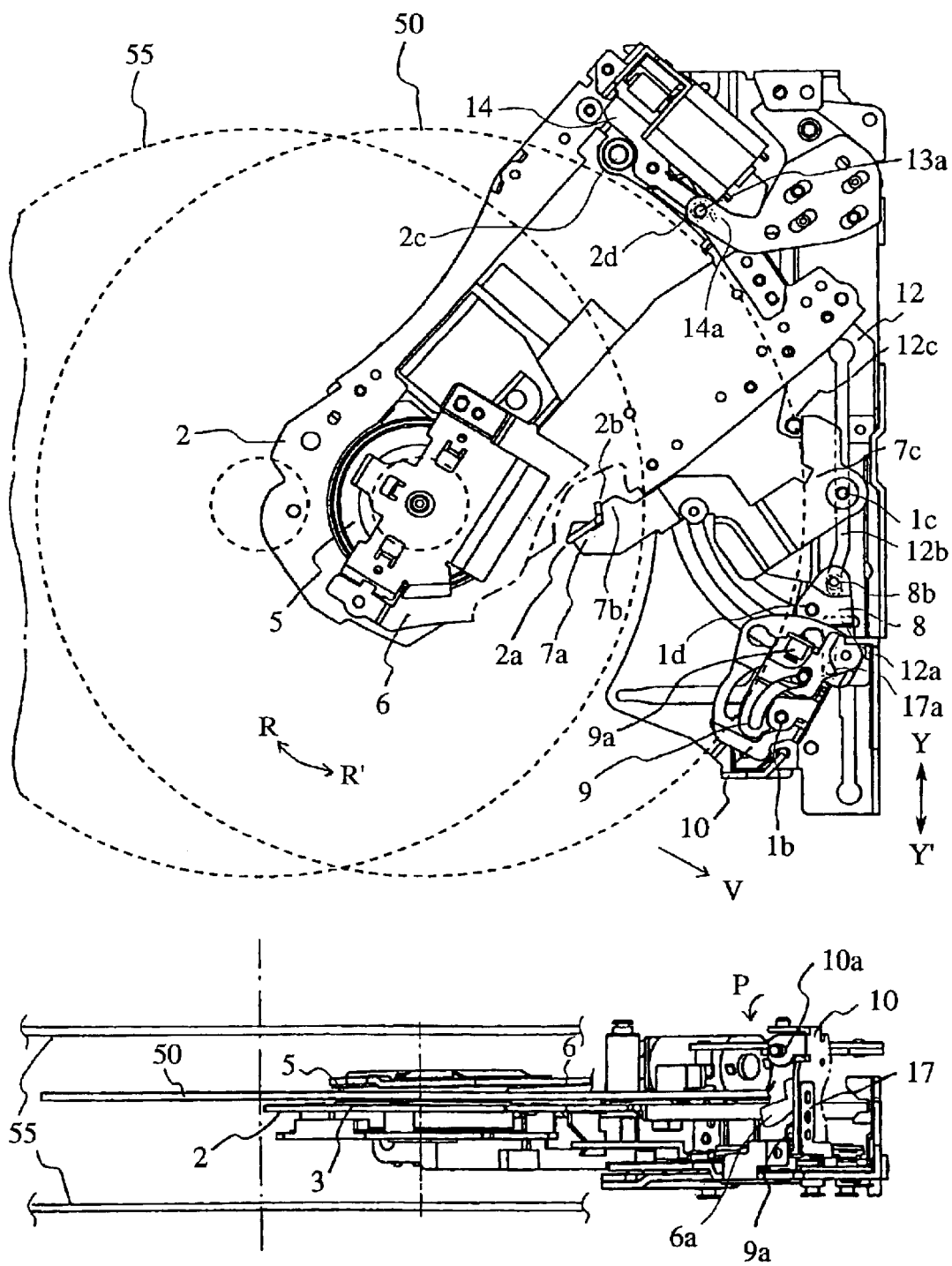
FIG. 7 are explanatory diagrams to show an operation in a fifth stage of the disk device.
Figure 14:
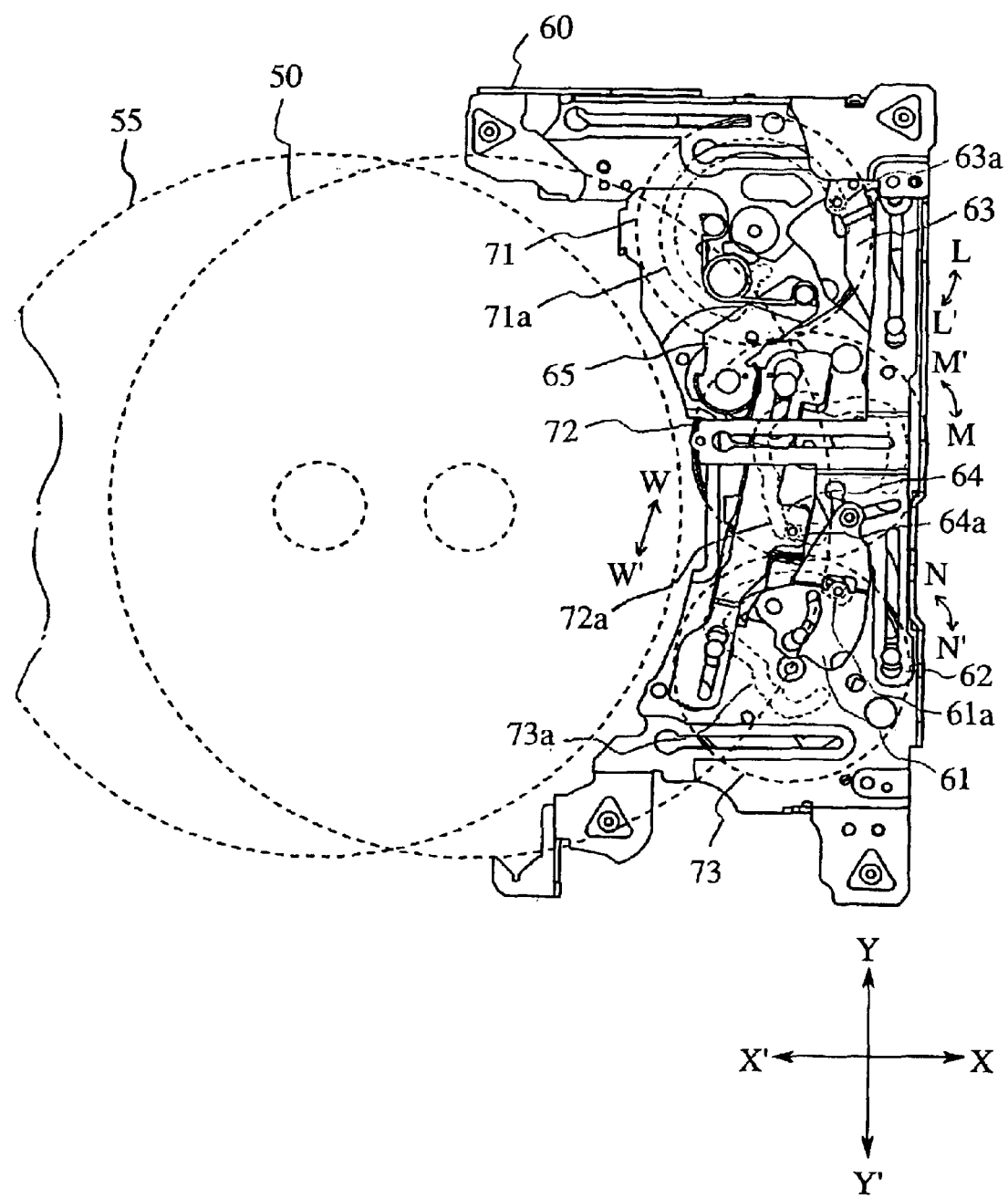
FIG. 14 is an explanatory diagram to show an operation in a fifth stage of the disk device.

Next, after the disk pinching and holding means which is not shown in the drawing is removed from the selected disk 50, the cam gear 72 swings further, and by means that the rack plate 64 moves in W' direction of the drawing, the lever 65 is made to swing, thereby the base 1 moves to a predetermined disk reproducing position in X direction of the drawing, then a state shown in FIG. 7 and FIG. 14 is realized.

At this point the cam gear 71 swings in L direction of the drawing and the cam gear 73 swings in N direction of the drawing, however, the lever 63 and the lever 61 are not moved because the cam hole 71a and 73a have concentric shapes, as a result of these the reproducing base 2 and the clamper base 10 are also not moved and stayed at a predetermined swinging position and they moves to a predetermined disk reproducing position with the base 1. After the above described operation the turn table 3 is rotated by a spindle motor (not shown), and reproducing of the selected disk 50 is begun. Herein about discharging operations of the selected disk after the reproducing has been over, because the operations described above are retrogradely repeated, further explanation will be omitted.

Industrial Applicability

As set forth above, the disk device in accordance with the present invention is suitable for the disk device in which it is required that the reproducing base is accurately positioned in a predetermined position when an arbitrary disk is reproduced and so on.

What is claimed is:

1. A disk device comprising:
   a reproducing base which is supported pivotally and enably to swing on a base, and on which a turntable is set;
   a supporting member which is supported pivotally and enably to swing on said base and which supports said reproducing base in a predetermined position;
   a clamper which is supported pivotally and enably to swing on said base and which opposes to said turntable to pinch and hold a disk; and
   a movement regulating member which regulates swing movements of said supporting member and said clamper.

2. The disk device according to claim 1 characterized by that an engaging and abutting portion between said supporting member and said reproducing base is constituted such that an engaging and abutting surface between the supporting member and the reproducing base matches substantially with a tangential direction of swing locus of said supporting member.

3. The disk device according to claim 2 characterized by that the engaging and abutting portion between said supporting member and said reproducing base is claw shapes which engage each other.

4. The disk device according to claim 1 characterized by that the movement regulating member makes the clamper to begin clamping the disk after the supporting member and the reproducing base engage together.

* * * * *